UNITED STATES PATENT OFFICE.

CHARLES E. ROGERS, OF DETROIT, MICHIGAN.

METHOD OF PASTEURIZING MILK OR CREAM.

1,095,231.  Specification of Letters Patent.  Patented May 5, 1914.

No Drawing.   Application filed February 8, 1912. Serial No. 676,371.

*To all whom it may concern:*

Be it known that I, CHARLES E. ROGERS, a citizen of the United States, residing at Detroit, county of Wayne, State of Michigan, have invented a certain new and useful Improvement in Methods of Pasteurizing Milk or Cream, and declare the following to be a full, clear, and exact description of the same, such as will enable others skilled in the art to which it pertains to make and use the same.

This invention relates to a method of pasteurizing milk or cream and its object is a method of treatment whereby the fluid treated will keep in a sweet and palatable condition for a much longer period of time than is ordinarily attained by the methods at present in use.

Both milk and cream deteriorate rapidly due to the presence and growth of bacteria therein and, as is well known in the art, heating the fluid and raising its temperature to from 140 degrees to 150 degrees F. practically destroys this germ life and the fluid will remain sweet for a greater period of time than if not so treated.

At the present time the principal creameries and milk depots pasteurize the greater part of the milk and cream received, but the results attained are not entirely satisfactory either to the dealer or the consumer as the product still does not keep for a sufficient period of time. This I have found to be due to the rapid development of bacteria in the product after pasteurization, the germ content in several samples tested twenty-four hours after treatment generally being as high as, and some higher than, 2,000,000 organisms per cubic centimeter. Evidently such a high "bacterial count" cannot result from the development of the organisms from the spores contained in the product which are not destroyed by the treatment and must, therefore, result from faults arising in the method of treatment. The method generally in use throughout the United States for this purpose is to heat the milk or cream to the desired temperature (substantially 145 degrees F.), immediately cool the fluid by passing it over cold pipes or analogous means, and then bottle the product in bottles at normal temperature, and finally cap the bottles with a paper cap. A variation of this method lately coming into use consists in holding the fluid at the temperature stated for a period of about thirty minutes before cooling, the succeeding steps following in the order and manner stated. The cooling of the fluid is performed while the product is open to the air in the plant and it may, therefore, readily become contaminated. The bottling of the fluid is usually performed in a room arranged for such purpose where the fluid is continuously in contact with the bacteria laden air and the bottles are also infected prior to filling due to their remaining in such air while drying and cooling after being cleansed. It is therefore not surprising that milk and cream treated in this manner becomes infected and deteriorates rapidly after treatment for, although the germ life has been destroyed during a portion of the treatment, bacteria are directly introduced thereinto as soon as the fluid has cooled to such extent that the organisms may exist therein.

By my improved method of treatment the milk or cream cannot become infected from any exterior source until the bottles are uncapped and may be delivered to the consumer within a certain time limit in practically as perfect condition as when bottled and consists in the following steps or the obvious variations thereof hereinafter described: First—Heating the milk or cream to from 140 degrees to 150 degrees F. Second—Placing the heated fluid in bottles or packages heated to substantially the same degree. Third—Capping the bottles or sealing the packages. Fourth—Holding the capped bottles or sealed packages in a pasteurizing temperature for a period of about thirty minutes. Fifth—Cooling the bottled or packaged fluid.

The first step may be performed in any convenient manner as, for instance, by the use of any of the pasteurizers at present in use for such purpose. While the temperature at which this step may be performed may vary somewhat, it should not exceed 160 degrees F. as a temperature much higher than this would result in a cooked taste being imparted to the product.

The second step, that of filling heated bottles or packages with the heated fluid, may be accomplished by means of any of the filling machines at present in use for this purpose. Obviously this step may be performed with bottles that are not heated as a succeeding step would destroy such germ life as might exist in the bottle or package, but I prefer to heat the bottles and fill them while so heated thus introducing the fluid into a package that is free of vegetating organisms.

The third step, that of capping the bottles, may be performed by apparatus at present in use or by hand if so desired and the preferable cap is the paper cap now most universally in use for this purpose. While the preferable package is the glass bottle at present in use for the distribution of milk and cream, it is evident that packages of a different nature and form may be utilized for this purpose in which case this step would be performed by sealing such packages in the manner usual with the form and type employed and it is to be understood that this step may be performed in such manner without departing from the spirit of this invention.

The fourth step, that of holding the packaged fluid in a pasteurizing temperature for about thirty minutes, may be accomplished by simply placing the capped or sealed packages in a chamber or room having the proper temperature and for the required period of time or it may be accomplished by placing the packaged fluid in water of the required temperature for the required period. One of the faults of the present method of treatment is that the fluid is heated only for a moment or so and furthermore is not uniformly heated. The germ life existing therein, therefore, is not as completely destroyed as is possible with the degree of temperature employed, but by heating for a longer period (as has lately been the practice) the organisms may be as completely destroyed as is possible at the temperature stated. This latter method, however, while effectual at the time of heating, has its effectiveness destroyed by the introduction of bacteria therein during and after cooling. It is to overcome these defects in treatment that this step is employed in the manner above outlined and an essential characteristic of the step is that the fluid is packaged and capped or sealed during its performance. The temperature at which this step may be performed should not materially exceed 145 degrees F. Otherwise the product will become defective due to the length of time it is so heated.

The fifth step, that of cooling the packaged fluid, should be performed immediately following the previous step and should be performed by stages. An effectual method of performing the step is in placing the filled packages in water of the proper temperature and the first stage consists in placing the packages in water having a temperature of substantially 70 degrees F. and the packages should remain in the water until the contents thereof are approximately of the same temperature as the water when they should immediately be placed in water having a temperature of substantially 40 degrees F. until the contents of the package is of the same temperature.

The above described process does not require any apparatus other than that which is well known or at present in use for like purposes and may be readily performed without the use of machinery if so desired. However, for the pasteurization of milk or cream on a commercial scale, advantage should be taken of present known apparatus and the arrangement thereof should be such that the labor of handling be reduced to a minimum.

While the method outlined is the preferable one, the first two steps may be eliminated and replaced by that step which consists in placing the fluid to be treated in bottles while both the fluid and the bottles are at normal temperature, the third and succeeding steps next taking place in order. Such variation is possible by reason of the fourth step as outlined whereby the germ life is effectually destroyed.

As is well known in the art, pasteurizing milk and cream does not destroy all the spores contained therein for which purpose a much higher degree of temperature would be required than is above stated. Fluid so treated, therefore, will after a certain length of time contain living organisms which have developed from the spores as well as those which have been introduced thereinto in the manner stated. By my improved method no living organisms exist in the fluid at the time it is ready for delivery to the consumer and none may enter the fluid until the package is opened. Samples treated by my improved method that were tested 24 hours after treatment showed a bacterial content of less than 1000 per cubic centimeter and in a number of instances contained about 600 per cubic centimeter, while, as above stated, tests made or milk treated by the usual method now in use showed approximately 2,000,000 organisms in the same volume 24 hours after treatment. Evidently, milk and cream treated by the improved method will keep 24 to 36 hours longer than that treated by present methods as deterioration can only be caused by the development of bacteria from the spores that were not destroyed in the treatment.

Having thus fully described my improved method of pasteurizing milk and cream and the ways and means by which it may be performed, what I claim and desire to secure by Letters Patent of the United States is—

1. The herein described method of treating milk or cream which consists in heating the fluid to substantially 140 to 150 degrees F., placing the heated fluid in heated bottles, capping the bottles, subjecting the filled and capped bottles to a temperature of substantially 140 to 150 degrees F. for a period of about thirty minutes, and finally cooling the bottled fluid.

2. The herein described method of treating milk or cream which consists in heating the fluid to substantially 140 to 150 degrees F., placing the fluid while heated in bottles heated to substantially the same degree, capping the bottles, subjecting the filled and capped bottles to a temperature of substantially 140 to 150 degrees F. for a period of about thirty minutes, and finally cooling the bottled fluid.

3. The herein described method of treating milk or cream which consists in heating the fluid to substantially 140 to 150 degrees F., placing the fluid while heated in packages heated to substantially the same degree, sealing the packages, subjecting the sealed packages to a pasteurizing temperature for a period of about thirty minutes, and finally cooling the packaged fluid.

4. In a method of pasteurizing milk or cream, that step or steps which consists in heating the fluid to a pasteurizing temperature, placing the fluid, while heated, in packages heated to substantially the same degree, sealing the packages, and immediately subjecting the packaged fluid to a pasteurizing temperature for a period of about thirty minutes.

5. The herein described method of treating milk or cream, which consists in heating the fluid to substantially 140 to 150 degrees F., placing the fluid while so heated in bottles heated to substantially the same degree, closing the bottles with a cap or analogous device, subjecting the filled and closed bottles to a temperature of substantially to 140 to 150 degrees F. for a period of about 30 minutes, and finally cooling the bottled fluid by immediately placing in water having a temperature of substantially 70 degrees F. until the fluid is of that temperature and then immediately placing the fluid in water having a temperature of substantially 40 degrees F.

6. In a method of treating milk or cream the steps which consist in heating the fluid to a pasteurizing temperature, packaging the fluid while at a pasteurizing temperature, sealing the packages, subjecting the sealed packages to a pasteurizing temperature for a period of about 30 minutes, and then immediately cooling the packaged fluid.

7. In a method of treating milk or cream the steps which consist in heating the fluid to a pasteurizing temperature, placing the fluid while at a pasteurizing temperature in bottles having substantially the same temperature, capping the bottles while at said temperature, continuing the bottles at said temperature for a period of about 30 minutes after capping; and then immediately cooling the bottled fluid.

In testimony whereof, I sign this specification in the presence of two witnesses.

CHARLES E. ROGERS.

Witnesses:
CHARLES E. WISNER,
RICHARD ALSPAS.